United States Patent
Barmatov et al.

(10) Patent No.: US 10,808,164 B2
(45) Date of Patent: *Oct. 20, 2020

(54) CORROSION INHIBITION

(71) Applicant: SCHLUMBERGER TECHNOLOGY CORPORATION, Sugar Land, TX (US)

(72) Inventors: Evgeny Borisovich Barmatov, Cambridge (GB); Trevor Lloyd Hughes, Cambridge (GB); Jill F. Geddes, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/508,512

(22) PCT Filed: Aug. 26, 2015

(86) PCT No.: PCT/US2015/046958
§ 371 (c)(1),
(2) Date: Mar. 3, 2017

(87) PCT Pub. No.: WO2016/036560
PCT Pub. Date: Mar. 10, 2016

(65) Prior Publication Data
US 2017/0240796 A1   Aug. 24, 2017

(30) Foreign Application Priority Data

Sep. 3, 2014 (GB) .................................. 1415614.5

(51) Int. Cl.
*C23C 22/40* (2006.01)
*C09K 8/54* (2006.01)
(Continued)

(52) U.S. Cl.
CPC .................. *C09K 8/54* (2013.01); *C09K 8/74* (2013.01); *C23C 22/40* (2013.01); *C23C 22/73* (2013.01);
(Continued)

(58) Field of Classification Search
CPC ...................................................... C23C 22/72
See application file for complete search history.

(56) References Cited

U.S. PATENT DOCUMENTS 3,247,086 A * 4/1966 Goldstein .............. C25D 11/34
205/206
4,992,116 A * 2/1991 Hallman ............... C23C 22/361
148/247
(Continued)

FOREIGN PATENT DOCUMENTS

EP   0086245 A1   8/1983
EP   0527278 A1   2/1993
(Continued)

OTHER PUBLICATIONS

Machine Translation of JP-2000219980-A, retrieved Nov. 2, 2018.*
(Continued)

*Primary Examiner* — David P Turocy

(57) ABSTRACT

A method of inhibiting corrosion of duplex stainless steel by aqueous acidic solution, comprises carrying out a preliminary treatment which is passivation of the steel while exposing the steel to a first aqueous acidic solution containing at least one organic corrosion inhibitor able to adsorb to a steel surface, so as to deposit a passivating and corrosion inhibiting film on the steel surface; and thereafter during a second period of time exposing the steel to a second aqueous acidic solution different from the first aqueous acidic solution and also containing at least one organic corrosion inhibitor able to adsorb to a steel. The second aqueous acidic solution maintains the film on the steel surface, such that (Continued)

weight loss through corrosion in the second period of time is lower than the weight loss which would be observed with the same second aqueous acidic solution but without carrying out the preliminary treatment.

16 Claims, 4 Drawing Sheets

(51) Int. Cl.
  C23F 11/04 (2006.01)
  E21B 41/02 (2006.01)
  C09K 8/74 (2006.01)
  C23C 22/73 (2006.01)
  C25D 11/00 (2006.01)
  E21B 43/25 (2006.01)

(52) U.S. Cl.
  CPC ............. *C23F 11/04* (2013.01); *C25D 11/00* (2013.01); *E21B 41/02* (2013.01); *E21B 43/25* (2013.01); *C09K 2208/32* (2013.01)

(56) References Cited

U.S. PATENT DOCUMENTS

| | | | | |
|---|---|---|---|---|
| 5,129,967 | A * | 7/1992 | Sander | C23C 22/34 148/247 |
| 5,209,859 | A | 5/1993 | Williams et al. | |
| 5,614,028 | A | 3/1997 | Rodzewich | |
| 7,994,101 | B2 * | 8/2011 | Cassidy | C09K 8/54 507/235 |
| 10,087,530 | B2 * | 10/2018 | Hughes | C23F 11/04 |
| 2004/0094236 | A1 * | 5/2004 | Maurer | C23C 22/44 148/252 |
| 2007/0017602 | A1 * | 1/2007 | Koch | C23C 22/34 148/247 |
| 2010/0015429 | A1 * | 1/2010 | Anderson | C23C 24/00 428/315.7 |
| 2011/0224111 | A1 | 9/2011 | Gupta et al. | |
| 2013/0161062 | A1 * | 6/2013 | Yamaoka | C09D 5/084 174/110 SR |
| 2015/0004054 | A1 * | 1/2015 | Richardson | C02F 1/683 422/15 |
| 2016/0010217 | A1 | 1/2016 | Hughes et al. | |
| 2018/0312980 | A1 * | 11/2018 | Crawford | C23F 11/04 |

FOREIGN PATENT DOCUMENTS

| | | | |
|---|---|---|---|
| JP | 2000219980 A * | 8/2000 | |
| JP | 2010016045 A | 1/2010 | |
| WO | WO2014136012 A1 | 9/2014 | |

OTHER PUBLICATIONS

Burstein, G.T., "Passivity and Localised Corrosion", Chapter 2.02 in Shreir's Corrosion, vol. 2: Corrosion in Liquids, Corrosion Evaluation, Editors: Cottis, Graham, Lindsay, Lyon, Richardson, Scantlebury and Stott, Elsevier Ltd., 2010, 26 pages.

Hamilton Metals Material Guide, [http://www.hamiltonmetals.com/images/MaterialGuide.gif], Retrieved Apr. 20, 2018, 1 page.
"Duplex 2205 Technical Data", [http://www.pennstainless.com/duplex2205-techdata.php], retrieved Apr. 25, 2018, 2 pages.
Hashimoto, K. et al., "The role of corrosion-resistant alloying elements in passivity", Corrosion Science, 2007, 49(1), pp. 42-52.
Park, P. Y. et al., "The Corrosion Behavior of Sputter-Deposited Mo Ta Alloys in 12 M HCl Solution", Corrosion Science, 1996, 38(3), pp. 397-411.
Kim, J. H., et al., "The Corrosion Behavior of Sputter Deposited Amorphous Cr—Nb and Cr—Ta Alloys in 12 M HCl Solution", Corrosion Science, 1993, 34(12), pp. 1947-1955.
Park, P. Y. et al., "The Corrosion Behavior of Sputter-Deposited Cr—Mo Alloys in 12 M HCl Solution", Corrosion Science, 1995, 37(11), pp. 1843-1860.
Park, P. Y. et al., "The Corrosion Behavior of Sputter-Deposited Mo—Ti Alloys in Concentrated Hydrochloric Acid", Corrosion Science, 1996, 38(10), pp. 1649-1667.
Park, P. Y. et al., "The Corrosion Behavior of Sputter-Deposited Amorphous Mo—Zr Alloys in 12 M HCl", Corrosion Science, 1995, 37(2), pp. 307-320.
Park, P. Y. et al., "The Corrosion Behavior of Sputter-Deposited Mo—Nb Alloys in 12 M HCl", Corrosion Science, 1996, 38(10), pp. 1731-1750.
Habazaki, H. et al., "The Corrosion Behavior of Amorphous Fe—Cr—Mo—P—C and Fe—Cr—W—P—C Alloys in 6 M HCl Solution", Corrosion Science, 1992, 33(2), pp. 225-236.
Hashimoto, K. et al., "An X-Ray Photo-Electron Spectroscopic Study on the Role of Molybdenum in Increasing the Corrosion Resistance of Ferritic Stainless Steels in HCl", Corrosion Science, 1979, 19(1), pp. 3-14.
Ahn, M. K. et al., "Quantitative Comparison of the Influences of Tungsten and Molybdenum on the Passivity of Fe—29Cr Ferritic Stainless Steels", Corrosion Science, 1998, 40(2-3), pp. 307-322.
Lo, I.-H. et al., "Effect of selective dissolution on fatigue crack initiation in 2205 duplex stainless steel", Corrosion Science, 2007, 49(4), pp. 1847-1861.
Fritz, J., "Effects of Metallurgical Variables on the Corrosion of Stainless Steels", in ASM Handbook: vol. 13A: Corrosion: Fundamentals, Testing and Protection, ASM International, 2003, 7 pages.
Kruger, J., "Passivity", in ASM Handbook: vol. 13A: Corrosion: Fundamentals, Testing and Protection, ASM International, 2003, 27 pages.
Combined Search and Exam Report of GB Patent Application No. 1415614.5 dated Jun. 9, 2015, 7 pages.
Exam Report under Section 18(3) of GB Patent Application No. 1415614.5 dated Sep. 19, 2016, 2 pages.
Combined Search and Exam Report of GB Patent Application No. 1614786.0 dated Sep. 21, 2016, 4 pages.
Search Report and Written Opinion of International Patent Application No. PCT/US2015/046958 dated Dec. 15, 2015, 12 pages.
International Preliminary Report on Patentability of International Patent Application No. PCT/US2015/046958 dated Mar. 16, 2017, 8 pages.
"2205 Duplex Stainless Steel", Flowserve Corporation, 1999, 1 page.
"Duplex Stainless Steels—A Simplified Guide", British Stainless Steel Association, https://www.bssa.org.uk/topics.php?article=668, Aug. 22, 2014, retrieved from Archive.org on Nov. 5, 2019, 3 pages.

* cited by examiner

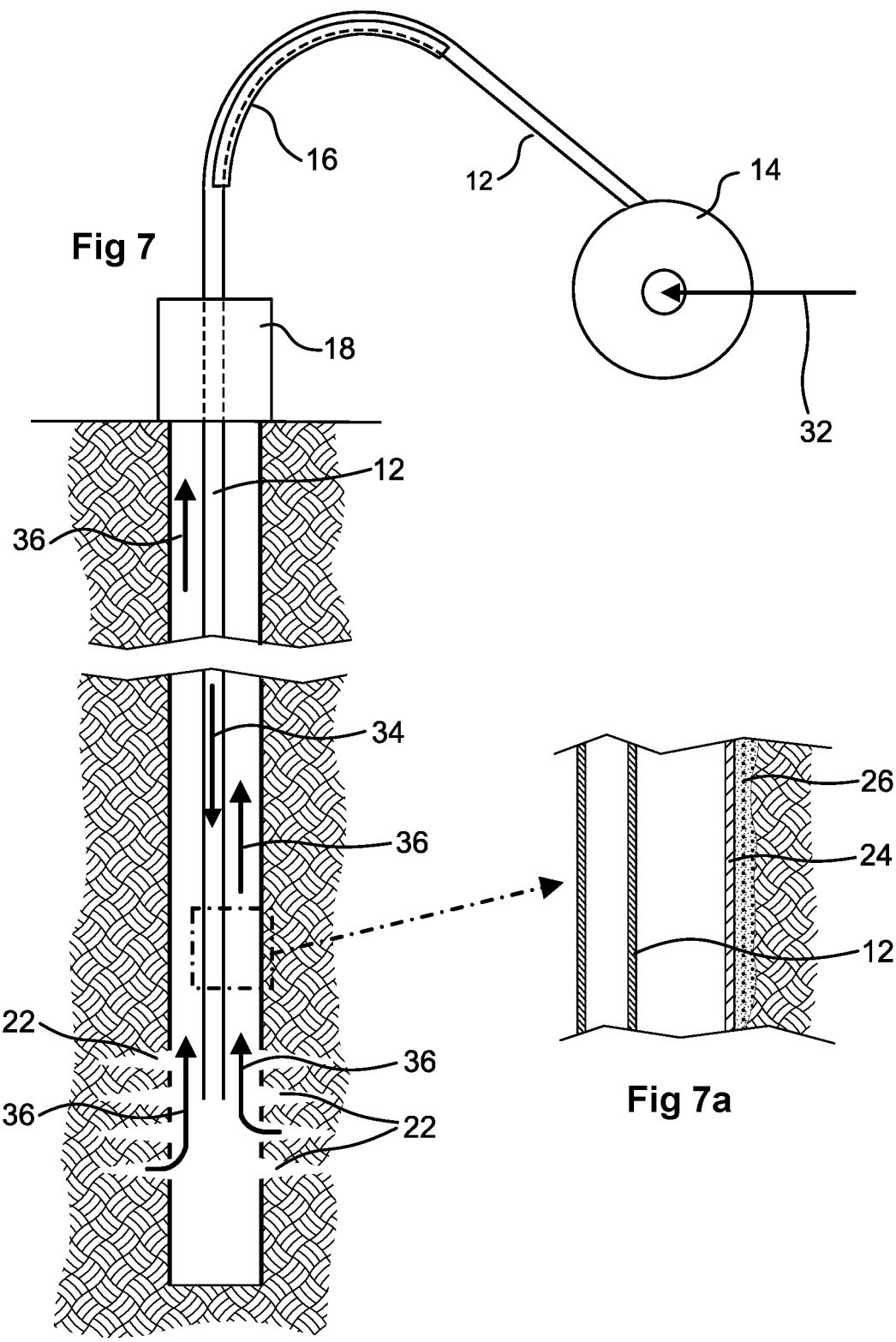

CORROSION INHIBITION

BACKGROUND

There are numerous circumstances where it is desired to protect steel from corrosion by acidic material to which it is exposed. These include the protection of steel exposed to an aqueous acidic liquid such as when steel tubing is used to convey a flow of aqueous liquid.

One industry which has a need for protection of steel against corrosion is oil and gas exploration and production. Steel tubulars used in a borehole may be exposed to an acidic liquid mixture and so also may steel pipelines used to carry produced oil and gas. Exposure to acidic solution may be exposure to subterranean brine which happens to be acidic, or it may be exposure to acid deliberately used in an oilfield operation.

The technique of matrix acidising, in which the producing formation is treated with acid to stimulate production is a cathodic reaction occurring on the same metal surface; typically, the cathodic reaction is reduction of dissolved oxygen and/or reduction of water to form hydrogen.

Passivating oxide films are most commonly generated directly on the metal surface without the constituent metal ions first passing into solution. Such films (of typical thickness 1-10 nm) are coherent, dense and continuous.

Steels may have a single phase, either ferrite or austenite, or may have two phases mingled together. Single-phase stainless steels owe their corrosion resistance to surface enrichment of the passivating component, chromium. A minimum Cr concentration (12-13 wt %) is required for sufficient enrichment in the passivating oxide film.

Duplex stainless steels are composed of a mixture of austenite and ferrite phases, most typically with each phase in the range 25-75 vol %. They may have either a ferrite matrix or an austenitic matrix. As shown by the following table, the specified compositions for a range of duplex stainless steels include molybdenum and sometimes include other alloying metals such as tungsten, manganese and copper.

| Metal Name | UNS no. | \multicolumn{5}{c}{Composition (wt %)} | Ni/Cr ratio |
|---|---|---|---|---|---|---|---|---|
| | | C | N | Cr | Ni | Mo | Cu, W, other | |
| "Lean" | S32101 | 0.03 | 0.22 | 21.5 | 1.5 | 0.3 | | 0.070 |
| 2304 | S32304 | 0.02 | 0.10 | 23.0 | 4.8 | 0.3 | | 0.209 |
| 2404 | S82441 | 0.02 | 0.27 | 24.0 | 3.6 | 1.6 | | 0.15 |
| 2205 | S32205 | 0.02 | 0.17 | 22.0 | 5.7 | 3.1 | | 0.259 |
| 2507 | S32750 | 0.02 | 0.27 | 25.0 | 7.0 | 4.0 | | 0.28 |
| SM22Cr | | ≤0.03 | 0.08-0.20 | 21.0-23.0 | 4.5-6.5 | 2.5-3.5 | — | 0.25 |
| SM25Cr | | ≤0.03 | 0.10-0.30 | 24.0-26.0 | 5.5-7.5 | 2.5-3.5 | W 0.1-0.5 | 0.26 |
| SM25CrW | | ≤0.03 | 0.24-0.32 | 24.0-26.0 | 6-8 | 2.5-3.5 | W 2.1-2.5 | 0.28 |
| 2205 | S32205 | 0.03 max | 0.08-0.20 | 21.0-23.0 | 4.5-6.5 | 2.5-3.5 | Si 1.0 max Mn 2.0 max | 0.25 |
| DP3 | S31260 | 0.03 | 0.1-0.3 | 24.0-26.0 | 5.5-7.5 | 2.5-3.5 | Cu 0.2-0.8 W 0.1-0.5 | 0.26 |
| 255 | S32550 | 0.04 | 0.1-0.25 | 24.0-27.0 | 4.5-6.5 | 2.9-3.9 | Cu 1.5-2.5 | 0.216 |
| 100 | S32760 | 0.03 | 0.2-0.3 | 24.0-26.0 | 6.0-8.0 | 3.0-4.0 | Cu 0.5-1.0 W 0.5-1.0 | 0.28 |
| 52N+ | S32520 | 0.03 | 0.2-0.35 | 24.0-26.0 | 5.5-8.0 | 3.0-5.0 | Cu 0.5-3.0 | 0.27 |
| 2507 | S32507 | 0.03 | 0.24-0.32 | 24.0-26.0 | 6.0-8.0 | 3.0-5.0 | Cu 0.50 | 0.28 | involves deliberate exposure of borehole steel to acid. This operation may be performed with coiled tubing which is run into a borehole and then used to convey acid down the borehole to the formation. When the operation comes to an end, the steel casing in the borehole and the exterior of the coiled tubing can be exposed to so-called unspent acid flowing back with formation fluids towards the surface.

Stainless steels, which are alloys with iron, chromium and nickel as the main constituents, resist corrosion because of the formation of a passivating film on the metal surface. Steel pipework and steel casing in a borehole are sometimes made of duplex stainless steel and are examples of duplex stainless steel which may be exposed to acidic solution.

There is a large published literature on passivity and passivating films. Passivity is a state of low corrosion rate due to the presence of a surface film, most commonly an oxide, formed under a high anodic driving force, or potential. Passivated metals possess kinetic stability as the film forms a barrier between the underlying metal and the corrosive environment.

Passivity can be stimulated by an applied electrical potential or it may occur spontaneously. In the latter case, the sink for the electrons generated by anodic oxidation of the metal Common duplex alloys, e.g. 2205, contain 50-60 vol % austentite in a ferrite matrix, i.e. the ferrite is the continuous phase. The main alloying elements, chromium, molybdenum, nickel, manganese and nitrogen are not equally distributed in the two phases. Austentite is enriched in nickel, manganese and nitrogen whilst ferrite is enriched in chromium and molybdenum. The nickel-rich austenite phase is cathodic relative to the anodic ferrite matrix.

Stainless steels may be protected against corrosion by contacting the steel with an organic corrosion inhibitor, as is conventional for the protection of ordinary steels.

Organic inhibitors adsorb on the metal surface. Adsorbed inhibitor(s) may influence the rate of corrosion by one or more of several mechanisms: (i) by forming a physical barrier film which restricts the diffusion of species to/from the metal surface, (ii) by blocking anodic and/or cathodic reaction sites directly, (iii) by interacting with corrosion reaction intermediates adsorbed on the surface and (iv) by influencing the electrical double layer that forms at the metal/solution interface.

Adsorption may be physi-sorption which is the result of electrostatic attractive forces between inhibiting organic ions or dipoles and the electrically charged surface of the metal. The surface charge of the metal is due to the electric field at the outer Helmholtz plane of the electrical double layer existing at the metal/solution interface.

Another possibility is that adsorption is by chemi-sorption, which takes place more slowly than electrostatic adsorption and with a higher activation energy. Chemi-sorption involves electron transfer from electron-rich sites within the structure of the inhibitor molecule(s) to vacant low energy orbitals in the metal. Typically, such electron-rich sites within an inhibitor molecule are heteroatoms with lone pair(s) of electrons or are multiple bonds and aromatic rings so that covalent bonds have electrons in π-orbitals. Because activation energy is required, to bring about chemi-sorption, the extent of chemi-sorption and therefore the efficacy of corrosion inhibition may increase with temperature. It is known that chemi-sorbed acetylenic compounds can react to form polymeric inhibitor films. Such reaction/polymerisation is surface-catalysed.

Corrosion inhibitors are frequently marketed as a mixture containing materials which inhibit corrosion and other materials which enhance inhibition, even though these other materials do not function as corrosion inhibitors (or are less efficacious) if used alone. In some cases these mixtures are proprietary and their exact composition is not made public.

A mixture which contains a chemi-sorbing corrosion inhibitor may also include non-ionic or cationic surfactants to assist deposition on steel, quaternary nitrogen compounds, amines (which will protonate to quaternary nitrogen under acidic conditions) and organic solvent. Some oilfield corrosion inhibitor products considered to provide good inhibition performance at high temperatures are mixtures which make use of a synergistic combination of an amine and an acetylenic alcohol.

The corrosion inhibiting effect of an inhibitor or corrosion inhibiting mixture can be tested in various ways. One direct method of testing is to use a test piece which is a sample of the steel to be protected, customarily referred to as a "coupon". This coupon is exposed for a measured length of time to an acidic solution containing a known concentration of corrosion inhibitor. The loss in weight of the coupon is measured and expressed as weight loss per unit surface area.

When steel is going to be exposed to a flow of an acidic composition, it is normal practice to test coupons of the steel with various concentrations of corrosion inhibitor in samples of the acidic composition. A concentration of inhibitor which produces an acceptably low weight loss is identified and this concentration of inhibitor is then maintained as a constant concentration in the flow of acidic composition to which the steel is exposed.

SUMMARY

This summary is provided to introduce a selection of concepts that are further described below. This summary is not intended to be used as an aid in limiting the scope of the subject matter claimed.

Disclosed here is a method of protecting an article of duplex stainless steel by an initial pretreatment stage prior to a longer period (which may be use of the steel article) in which there is exposure to corrosive acid.

In a first aspect of this disclosure, a method of inhibiting corrosion of duplex stainless steel by aqueous acidic solution comprises
  during a first period of time, carrying out a preliminary treatment which is passivation of the steel while exposing the steel to a first aqueous acidic solution containing at least one organic corrosion inhibitor able to adsorb to a steel surface, so as to deposit a passivating and corrosion inhibiting film on the steel surface; and thereafter
  during a second period of time exposing the steel to a second aqueous acidic solution also containing at least one organic corrosion inhibitor able to adsorb to a steel surface,
  wherein the second aqueous acidic solution maintains the film on the steel surface, such that weight loss through corrosion in the second period of time is lower than the weight loss which would be observed with the same second aqueous acidic solution but without carrying out the preliminary treatment.

In embodiments of this method, the first and second aqueous solutions are different, either qualitatively different because they differ in their constituents or quantitatively because concentrations of constituents are different.

In a comparative test of the two solutions applied to clean samples of the steel without pre-existing corrosion, the second solution may be less effective than the first solution in creating a protective film on the steel and/or reducing weight loss from the steel.

By carrying out the pretreatment it becomes possible to use a second aqueous solution which might not be acceptable without the pretreatment. In consequence the weight loss through corrosion in the second period of time is lower than the weight loss which would be observed with the same second solution if the treatment with the first solution during the first period of time had not taken place.

The overall loss of weight from steel or the overall consumption of corrosion inhibiting compounds or both of these, can be less than if the corrosion inhibiting compound(s) are kept at a constant concentration throughout.

In some forms of this method, the concentration of corrosion inhibitor or inhibiting mixture in the acidic second solution which is less than in the first solution but maintains the protective film on the steel surface.

Passivation may be self-passivation taking place spontaneously in the presence of the first aqueous acidic solution. Possibly a positive electrical potential may be applied to the steel to bring about or assist the passivation. The film formed on the metal surface as a result of the pretreatment may contain molybdenum oxide derived from molybdenum as an alloying element in the steel and also contain corrosion inhibitor adsorbed to the steel surface.

The term "corrosion inhibitor" is used here to refer to chemical compounds which reduce the rate of corrosion of steel when added to a solution of a mineral acid, such as hydrochloric acid, with no other corrosion inhibitor present.

An organic corrosion inhibitor able to adsorb to the steel surface may have a molecular structure with at least one unsaturated group so that it has at least one covalent π-bond enabling the inhibitor molecule to chemi-sorb to the steel surface. The inhibitor may then be an unsaturated compound which polymerises on a steel surface. Compounds which can polymerise on a steel surface include cinnamaldehyde and homologues (in which an olefinic double bond is conjugated with both an aromatic ring and an aldehyde group), α-alkenyl phenones (in which the keto group is conjugated with an aromatic ring and an olefinic double bond in the alkenyl group, nitriles and acetylenic compounds, which may be alcohols. A corrosion inhibitor may be water soluble, for instance propargyl alcohol. If the corrosion inhibitor is hydrophobic, it may be an acetylenic alcohol which is liquid at atmospheric pressure and has a structure containing at least 6 carbons atoms, and possibly from 6 or 8 to 18 carbon atoms. When acetylenic compounds form a corrosion protecting film on a steel surface, the triple bond enables them to chemi-sorb, after which they polymerise on the surface.

Another possibility is that an organic corrosion inhibitor may have a structure which incorporates lone pair electrons on nitrogen, able to participate in chemi-sorption, or may incorporate quaternary nitrogen.

Organic corrosion inhibitor which adsorbs to the steel surface may be accompanied, in the first and/or in the second acidic aqueous solution, by a water-insoluble material which also deposits on the steel surface and contributes to the protective film. This water-insoluble material may have a boiling temperature, at atmospheric pressure, of at least 100° C. Such a material may be a water-insoluble amine, cationic surfactant, non-ionic surfactant or water-insoluble hydrophobic oil such as a hydrocarbon oil or a water insoluble ester, such as an ester of an acid containing at least 8 carbon atoms or of an alcohol containing at least 8 carbon atoms.

In some embodiments, the first and/or the second aqueous acidic solution contains at least one organic corrosion inhibitor which is able to chemisorb to the steel surface and polymerise on the steel surface in the presence of acid. Polymerisable group or groups in a corrosion inhibitor may be one or more of:
  (i) an acetylenic group (two carbons joined by a triple bond);
  (ii) a cyano group (carbon and nitrogen joined by a triple bond); or
  (iii) an alkenyl ketone or alkenyl aldehyde containing an olefinic double bond conjugated with the double bond of a keto group, thus providing a structure:

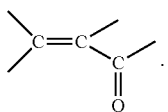

Examples of compounds containing an acetylenic group include acetylenic alcohols which are liquid at atmospheric pressure and have a structure containing at least 6 carbons atoms, and possibly from 6 or 8 to 18 carbon atoms, such as 5-methyl hex-1-yn-3-ol, 1-octyn-3-ol and 4-ethyl 1-octyn-3-ol.

An example compound containing a carbon-nitrogen triple bond (which may be termed a cyano or nitrile group) is cinnamonitrile.

Examples of alkenyl ketones are alkenyl phenones: e.g. 2-hydroxy-1-phenyl but-3-en-1-one, 3-methoxy-2-(methoxymethyl)-1-phenylpropan-1-one, 2-(methoxymethyl)-1-phenylprop-2-en-1-one, and phenylvinyl ketone. An example of an alkenyl aldehyde is trans-cinnamaldehyde.

Such a corrosion inhibitor may be accompanied by water-insoluble hydrophobic material which does not contain any unsaturated groups or contains aliphatic olefinic groups as the only unsaturation. As mentioned, such a material may have a boiling temperature of at least 100° C. at atmospheric pressure. Such a material may be a hydrocarbon oil such as hexadecane or an ester such as methyl oleate or an amine with more than six carbon atoms such as hexadecylamine. Examples of compounds containing olefinic groups are carboxylic acids and their esters where the carboxylic group contains unsaturation.

Water-insoluble materials in the first and second solutions may be suspended in the aqueous solution, may be accompanied by emulsifier or surfactant, which may be cationic or non-ionic, so as to be present in dispersed droplets or surfactant micelles, or may be accompanied by an organic solvent which is water soluble.

The concentrations of organic corrosion inhibitor in the first and second aqueous acidic solutions may be less than 5 wt %. They may be no more than 2 wt % and may be less than 1 wt %. In the first aqueous solution the concentration of organic corrosion inhibitor able to chemi-sorb to steel through polymerisable groups or nitrogen atoms may be less than 0.1 wt % but sufficient that in a test on clean uncorroded steel against a comparative solution which is the same except that the corrosion inhibitor is omitted, the weight loss is no more than half the weight loss with the comparative composition.

In the second aqueous acidic solution, the overall concentration of organic compounds which are able to chemisorb through unsaturated groups or which contain nitrogen may be no more than 0.1 wt %, possibly no more than 0.05 wt %.

Within the scope of the concepts disclosed here, three more specific forms may be defined, although their definitions are not mutually exclusive. In one form the first aqueous acidic solution contains acid at a concentration of at least 4.5 normal. For hydrochloric acid this is a concentration of at least 4.5 molar and is over 16 wt % acid. Such a concentration of acid leads to rapid passivation. The first and second aqueous acidic solutions both contain some organic corrosion inhibitor but the concentration of organic corrosion inhibitor in the first solution may or may not exceed that in the second solution.

In another form, the first aqueous acidic solution contains organic corrosion inhibitor at a greater concentration than in the second aqueous solution. For instance the first aqueous acidic solution may contain organic corrosion inhibitor able to chemi-sorb to the steel at a concentration which is at least three times the concentration in the second aqueous acidic solution.

In a third form the pretreatment includes application of anodic electrical potential to the steel. Again, the first and second aqueous acidic solutions both contain some organic corrosion inhibitor but the concentration of organic corrosion inhibitor in the first solution may or may not exceed that in the second solution.

The subject matter disclosed here has a diverse range of applications in which duplex stainless steel is protected from corrosion. One application is in the matrix acidizing of a reservoir formation where the wellbore casing is duplex stainless steel. In a first part of the matrix acidizing procedure, acidic solution is pumped down the wellbore through coiled tubing (which is not stainless steel) inserted into the wellbore. This acidic solution flows out into the reservoir formation.

At the end of the procedure the solution from the formation flows back to the surface via the annulus around the coiled tubing, so that the duplex stainless steel casing is exposed to the spent acid. This acid may contain some corrosion inhibitor but at a concentration regarded as insufficient to protect the casing from the spent acid.

Implementing the concept disclosed here, a protective solution is pumped down the coiled tubing towards the end of the procedure so that when flow back to the surface takes place, the protective solution ascends to the surface before the spent acid from the formation. This protective solution becomes the first aqueous acidic solution to contact the casing above the reservoir while the spent acid is the second aqueous acidic solution to do so. The protective solution is formulated to contain a higher concentration of organic corrosion inhibitor than in the spent acid, or a concentration of acid which is at least 4.5 normal together with some corrosion inhibitor. Thus the flow of the protective solution back to the surface performs a pretreatment of the casing above the reservoir. This protective solution could be allowed to enter the formation, in which case it would be the first part of the acidic solution to flow back to the surface, or it could start to flow up the wellbore as soon as it leaves the coiled tubing.

Thus in a second aspect there is disclosed a method of protecting duplex stainless steel wellbore tubing during a matrix acidizing operation in which matrix acidizing aqueous acid containing corrosion inhibitor is pumped down coiled tubing into a reservoir formation, the method comprising subsequently pumping an aqueous acidic protective solution down the tubing, so as to flow back to the surface ahead of spent matrix acidizing aqueous acid flowing back from the reservoir formation, wherein the protective solution contains at least one organic corrosion inhibitor able to adsorb to a steel surface and which is present at a greater concentration than in the matrix acidizing acid solution.

BRIEF DESCRIPTION OF THE DRAWINGS

FIG. 7 shows diagrammatically the use of coiled tubing in a matrix acidizing job, with a portion of the wellbore shown enlarged as FIG. 7a.

DETAILED DESCRIPTION AND EXAMPLES

As mentioned above, the present disclosure provides a method of protecting an article of duplex stainless steel using an initial pretreatment stage in which there is exposure to acid prior to a longer period (which may be use of the steel article) in which there is again exposure to acid. Organic corrosion inhibitor is present in both stages, but the pretreatment allows the concentration of corrosion inhibitor in the second stage to be less than would otherwise be required. The method may be employed in a wide variety of circumstances where duplex stainless steel is exposed to acid. More specific possibilities are duplex steel tubing exposed to acid. Duplex steel tubing may be wellbore casing.

The experimental examples below investigate the weight loss resulting from acidic corrosion, with and without corrosion inhibitor and then go on to examine weight loss when a two stage procedure is used.

The general procedure for measuring loss of weight from steel test pieces (referred to as coupons) was that coupons with surface area of 25-30 $cm^2$ were glass bead blasted to ensure a clean surface, measured to determine their exact surface area, weighed and then exposed to 100 mL of an acidic solution at 78° C. for a period of three hours.

After this period of exposure to acid each test coupon was washed with demineralized water and allowed to dry. It was then weighed to determine the weight loss and a value for weight loss per unit area was calculated. The results in the following examples are each an average of two replicate tests.

In these examples, hydrochloric acid was used at various concentrations. The correspondence between percentage by weight and molarity is given in the following table:

| Concentration (wt %) | Molarity |
| --- | --- |
| 5% | 1.4M |
| 10% | 2.8M |
| 14% | 4M |
| 17% | 4.75M |
| 20% | 5.6M |
| 28% | 8M |
| 37% | 10.3M |

EXAMPLE 1

Experiments were carried out with test pieces (coupons) of the following steels:
HS80, a low carbon steel used to fabricate coiled tubing.
N80, a medium carbon steel used to fabricate casing.
13Cr80, an alloy steel containing chromium without nickel, also used to fabricate casing.
22Cr125, a duplex alloy steel, also used to fabricate casing.

Elemental compositions of these steels are set out in the table below. Phosphorus and sulphur are not shown but are required to be at very low levels (below 0.1%) or entirely absent.

| | C | N | Fe | Cr | Ni | Cu | Mo | Mn | Si |
| --- | --- | --- | --- | --- | --- | --- | --- | --- | --- |
| HS80 | 0.10-0.15 | — | 97.07-97.87 | 0.45-0.70 | 0.25 (max) | 0.40 (max) | 0 | 0.60-0.90 | 0.3-0.5 |
| N80 | 0.24-0.33 | — | 97.33-98.26 | 0.04-0.16 | 0.012-0.028 | 0.010-0.019 | 0.018-0.05 | 1.19-1.66 | 0.22-0.39 |
| 13Cr80 | 0.15 | — | 83.11-86.11 | 11.5-14.5 | 0.16 | 0.01 | 0 | 1.0 | 1.00 |
| 22Cr125 | 0.14-0.20 | 0.08-0.20 | 64.55-69.73 | 21.0-23.0 | 4.5-6.5 | — | 2.5-3.5 | 1.0 (max) | 1.0 (max) |

Figure 1:
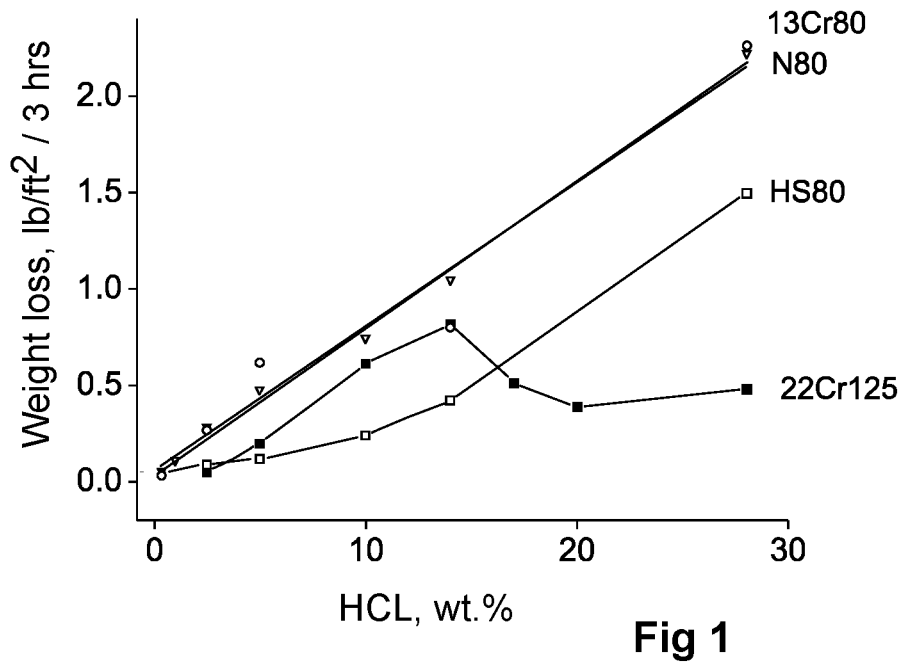
FIG. 1 is a graph showing weight-loss from samples of four types of steel plotted (on a linear scale) against concentration of hydrochloric acid, in tests without any pretreatment stage, as described in Example 1.

Weight loss tests, in acid without inhibitor, were carried out in accordance with the procedure above. The period of exposure to acid was three hours. The results obtained are plotted in FIG. 1 as a graph of weight loss against acid strength. It can be seen that for the HS80, N80 and 13Cr80 steels, the weight loss increased progressively with concentration of the acid. However, different behaviour was observed with 22Cr125. The weight loss values increase as the hydrochloric acid concentration increases from 0 to 14 wt % but a decreasing trend is observed at higher acid concentrations. This is due to self-passivation, i.e. passivation due to the formation of a stable oxide film under freely corroding conditions.

Figure 3:
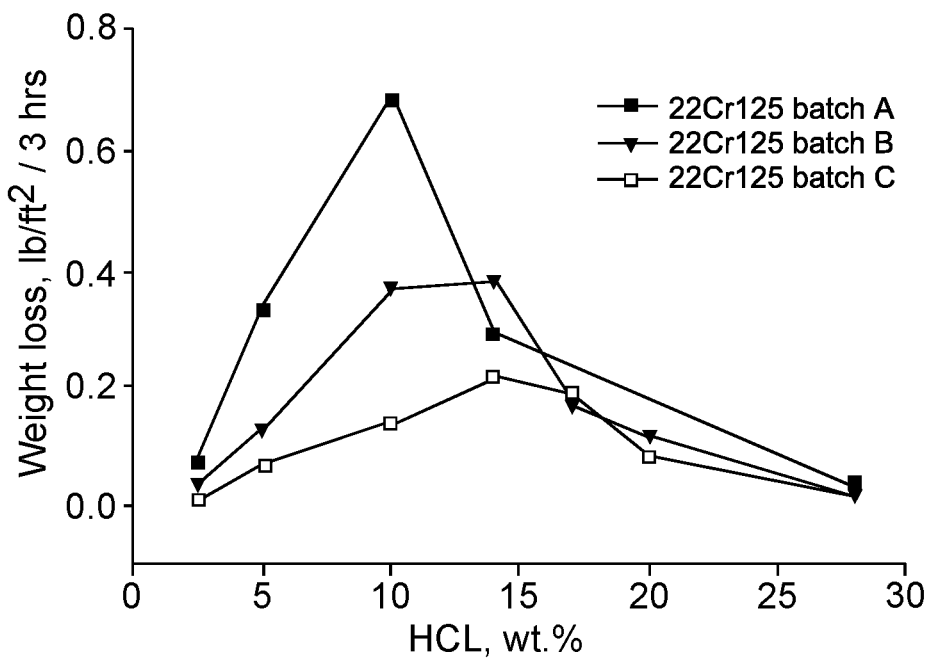
FIG. 3 is a corresponding graph to FIG. 2 showing weight loss when corrosion inhibitor was included in the acid.

The results shown in FIG. 3 were influenced by consumption of acid (so-called acid spending) during the 3 hour test period. When the weight loss from test coupons was large, the consumption of acid reduced the acid concentration. Thus the higher values of weight loss recorded in FIG. 1 might have been even higher if the acid concentration had been maintained at constant strength. However, this does not affect the observation that the duplex steel showed self-passivation and falling corrosion rates when the acid concentration was 17 wt % or above.

EXAMPLE 2

When 22Cr125 steel was exposed to hydrochloric acid, a black layer formed on the metal surface. A sample of this black layer was obtained by repeatedly exposing a test coupon to acid until the coupon had been dissolved away. The acid-insoluble black solid residue was then separated by filtration (glass microfiber filter paper) and washed with fresh aliquots of 14 wt % acid. After drying, the residue was analysed by X-ray Photoelectron Spectroscopy (XPS) and the major components were found to be molybdenum and oxygen, (Mo+O)=53 atomic %. Thus self passivation of duplex alloy steel can be attributed to formation of an insoluble protective layer of molybdenum oxides.

EXAMPLE 3

Figure 2:
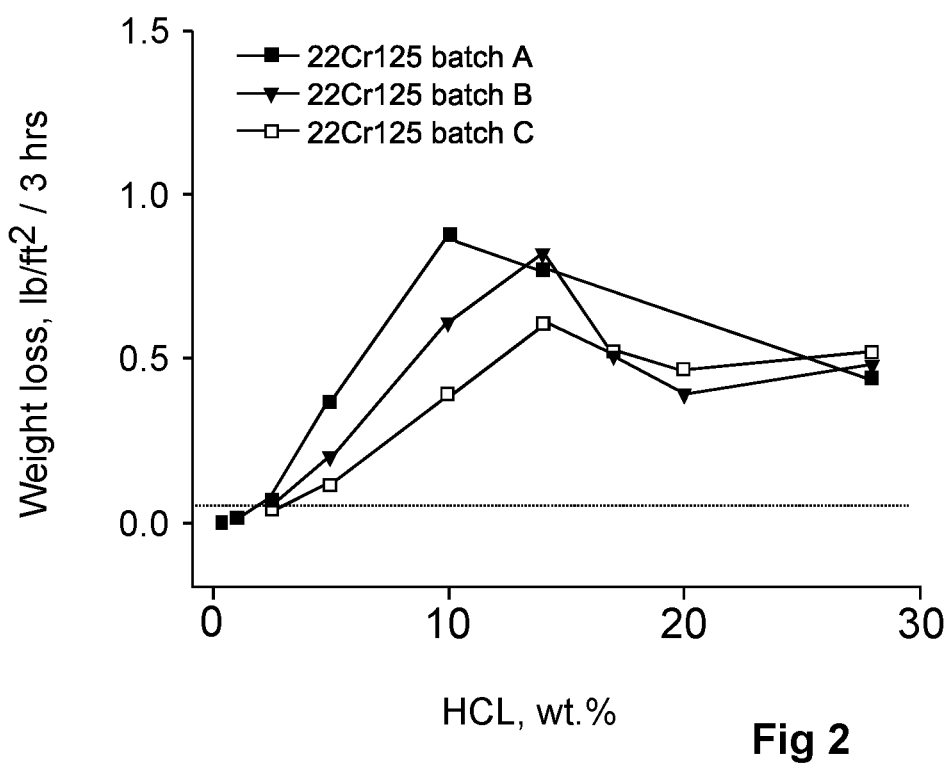
FIG. 2 is a graph showing weight loss from samples of three batches of duplex stainless steel plotted (on a linear scale) against concentration of hydrochloric acid, in tests without any pretreatment stage, as described in Example 3.

Weight loss tests were carried out on coupons of 22Cr125 steel from three manufacturing batches. These tests were carried out in acid without inhibitor and also in acid containing 0.2 wt % of a liquid corrosion inhibitor which contained which is 7% propargyl alcohol, 60% hydrocarbon oily phase and 33% methanol. The results are plotted in FIGS. 2 and 3. These show that this concentration of corrosion inhibitor gave some reduction in corrosion, and also show that the acid strength associated with peak corrosion varied from one manufacturing batch to another. This variation between batches was attributed to small differences in composition between manufacturing batches. Analysis of the steels showed molybdenum content varying between 2.82 and 3.05 wt %, and the Ni/Cr ratio varying between 0.213 and 0.248.

The surfaces of the coupons corroded in the weight loss tests were brushed to remove loose corrosion products and analysed for their elemental composition by X-ray fluorescence (XRF) spectrometry. Relative to XRF analyses of the uncorroded surface, several trends could be observed with increasing concentration of hydrochloric acid:

No significant change in wt % Mn as acid concentration increased..
As acid concentration increased from 2.5 to 28 wt %,there was a 1-2 wt % increase in Fe and 2-3 wt % decrease in Cr.
As acid concentration increased from 2.5 to 14 wt % there was a 2 wt % increase in Ni but Ni concentration declined as acid concentration increased further.

Significant Mo enrichment at the surface when the coupons are exposed to 10-28 wt % HCl and, in particular, strong Mo enrichment on exposure to 28 wt % HCl+0.2 wt % A264.

It was observed that much of the molybdenum rich solid formed at the metal surfaces was loosely held but some was adhering securely to the surface. In view of this surfaces were analysed by XRF both before cleaning and after an ultrasonic cleaning. This led to a finding that in the absence of corrosion inhibitor, corrosion by acid of 5 to 14 wt % concentration caused preferential dissolution of the Mo-rich ferrite phase (indicated by changes in the Ni/Cr ratio). However, when acid concentration was in the range 17-28 wt %, a persistent molybdenum enrichment of the surface was observed (even after cleaning). This was attributed to formation of a more adherent molybdenum-rich film on the metal when exposed to hydrochloric acid in the concentration range 17-28 wt %.

Coupons of one batch of 22Cr125 were exposed to 14% hydrochloric acid for three hours in the presence of varying concentrations of the corrosion inhibitor. After this exposure the surfaces were surfaces were examined by XRF both before and after ultrasonic cleaning. Ni/Cr ratios were calculated. The observed values of Ni/Cr ratio and Mo content are given in the following table

| Corrosion inhibitor | Before cleaning | | After cleaning | |
| --- | --- | --- | --- | --- |
| (wt %) | Ni/Cr ratio | Mo (%) | Ni/Cr ratio | Mo (%) |
| 0% | 0.36 | 3.46% | 0.33 | 2.95% |
| 0.2% | 0.345 | 3.45% | 0.33 | 3.02% |
| 0.6% | 0.29 | 3.35% | 0.285 | 3.18% |
| 1.0% | 0.28 | 3.36% | 0.28 | 3.18% |

The difference between the values at 0.2 wt % inhibitor and 0.6 wt % inhibitor indicates that when the inhibitor was present in the higher concentration range of 0.6-1.0 wt % it promoted a more uniform dissolution of the two phases (lower Ni/Cr ratios, both before and after cleaning) and a higher retention of persistent molybdenum after cleaning (about 3.2% at the surface which is higher than 3.05% determined by elemental analysis of the steel in bulk)

In summary, XRF analyses of corroded weight loss coupons indicate the following:
in the absence or presence of 0.2 wt % corrosion inhibitor, exposure to HCl concentrations in the range 17-28 wt % promotes formation of a persistent (adherent) molybdenum-rich passivating film.
when the HCl concentration is below the 17-28 wt % range, e.g. 14 wt %, the presence of a higher concentration of the corrosion inhibitor (0.6-1.0 wt %) promotes formation of a persistent (adherent) molybdenum-rich passivating film.

EXAMPLE 4

Figure 4:
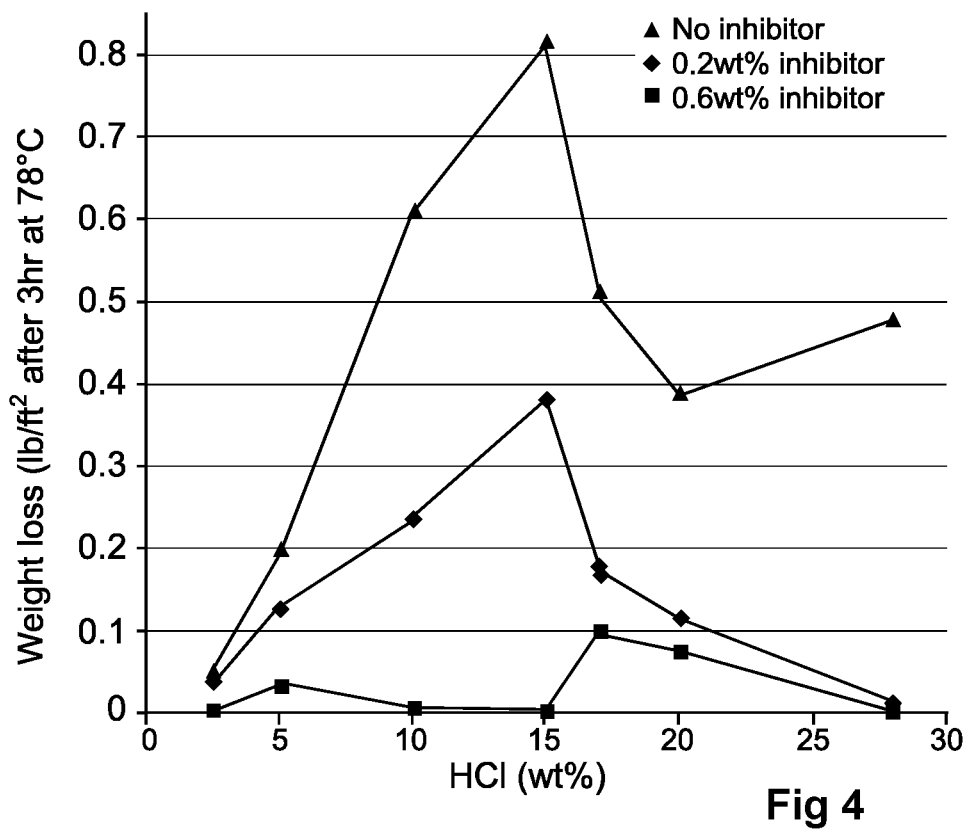
FIG. 4 is a graph showing weight loss from samples of one batch of duplex stainless steel with differing corrosion inhibitor included in the acid plotted (on a linear scale) against concentration of hydrochloric acid, as described in Examples 3 and 4.

The results of weight loss tests in Example 3 showed that corrosion was reduced by the inclusion of 0.2 wt % of the corrosion inhibitor although with the lower acid concentrations, the extent to which corrosion was reduced varied somewhat between the three steel batches. Weight loss tests on coupons from the three manufacturing batches were also carried out in acid containing 0.6 wt % of the liquid corrosion inhibitor. Results, which also include results from the previous example without corrosion inhibitor and with only 0.2 wt % corrosion inhibitor are set out in the following table. Results for one of the three batches of steel are also shown in FIG. 4.

|  | Corrosion | Weight loss | | | | | |
|---|---|---|---|---|---|---|---|
|  | Inhibitor. | Batch A | | Batch B | | Batch C | |
| Acid (wt %) | (wt %) | lbs/ft$^2$ | gm/m$^2$ | lbs/ft$^2$ | gm/m$^2$ | lbs/ft$^2$ | gm/m$^2$ |
| 5% | none | 0.35 | 1709 | 0.2 | 977 | 0.10 | 490 |
| 5% | 0.2 | 0.33 | 1611 | 0.13 | 635 | 0.07 | 342 |
| 5% | 0.6 | 0.18 | 879 | 0.04 | 1953 |  |  |
| 5% | 1.0 |  |  |  |  | 0.02 | 98 |
| 10 | none | 0.88 | 4297 | 0.6 | 2930 | 0.4 | 2344 |
| 10 | 0.2 | 0.69 | 3369 | 0.24 | 1172 | 0.12 | 586 |
| 10 | 0.6 | 0.09 | 439 | 0.01 | 49 |  |  |
| 10 | 1.0 |  |  |  |  | 0.02 | 98 |
| 14 | none | 0.78 | 3808 | 0.8 | 3906 | 0.21 | 1025 |
| 14 | 0.2 | 0.28 | 1367 | 0.38 | 1855 | 0.6 | 2930 |
| 14 | 0.6 | 0.0 | 0 | 0.01 | 49 |  |  |
| 14 | 1.0 |  |  |  |  | 0.01 | 49 |
| 17% | none |  |  | 0.51 | 2490 | 0.5 | 2441 |
| 17 | 0.2 |  |  | 0.17 | 830 | 0.19 | 928 |
|  | 0.6 |  |  | 0.10 | 488 |  |  |
|  | 1.0% |  |  |  |  | 0.01 | 49 |
| 20 | none |  |  | 0.39 | 1904 | 0.46 | 2246 |
|  | 0.2 |  |  | 0.12 | 586 | 0.07 | 342 |
|  | 0.6 |  |  | 0.08 | 391 |  |  |
| 20% | 1.0% |  |  |  |  | 0.04 | 195 |
| 28% | none | 0.44 | 2148 | 0.48 | 2344 | 0.5 | 2441 |
| 28% | 0.2 | 0.02 | 977 | 0.01 | 49 | 0.03 | 146 |
| 28% | 0.6 | 0.00 | 0 | 0.00 | 0 |  |  |
| 28% | 1.0% |  |  |  |  | 0.00 | 0 |

These results are consistent with the XRF results in the previous example, and show progressive reduction of corrosion with increasing concentrations of the corrosion inhibitor. Results with the other two batches of 22Cr125 steel also showed progressive reduction of corrosion with increasing concentrations of the corrosion inhibitor.

EXAMPLE 5

In this example a pretreatment step is carried out before a longer period in which steel is exposed to an acidic solution.

Weight loss tests were carried out by a modified procedure. In a first stage the coupons are exposed to a composition intended to deposit a protective film on the test coupons. This pretreatment stage, referred to in the drawings as the film-forming stage (FFS), lasted 1 hour after which the test coupon was washed with demineralized water, allowed to dry and weighed again. The weight loss test was then carried out as set out above, using an acidic solution for 3 hours. This second stage is referred to in the drawings as the film maintenance (FM) stage.

In the one hour pretreatment stage, coupons were exposed to acid without corrosion inhibitor. In the three hour second stage of the weight loss test the coupons were exposed to 14 wt % hydrochloric acid containing 0.2 wt % of the corrosion inhibitor. Results are set out in the following table:

| Pretreatment stage. No corrosion inhibitor Acid concentration | | Weight loss | |
|---|---|---|---|
| (wt %) | Second stage. | lbs/ft$^2$ | gm/m$^2$ |
| NONE | 14 wt % hydrochloric acid | 0.214 | 1045 |
| 5% | and 0.2 wt % inhibitor | 0.17 | 830 |
| 10% |  | 0.175 | 854 |
| 14% |  | 0.075 | 366 |
| 20% |  | 0.07 | 342 |
| 28% |  | 0.08 | 391 |
| 37% |  | 0.085 | 415 |

From the table above it can be seen that exposure to uninhibited acid of 14% strength or more, followed by 14% acid containing inhibitor led to a weight loss of 0.075 lbs/ft$^2$ during the subsequent three hours. This contrasts with a weight loss of three times as much when there was no pretreatment, thus indicating that self passivation with acid alone establishes a protective film which is then maintained in the second stage. It can also be seen that weaker or stronger acid in the pretreatment stage also established a protective film so that weight loss in the second stage was below the weight loss observed without the pretreatment.

EXAMPLE 6

Figure 5:
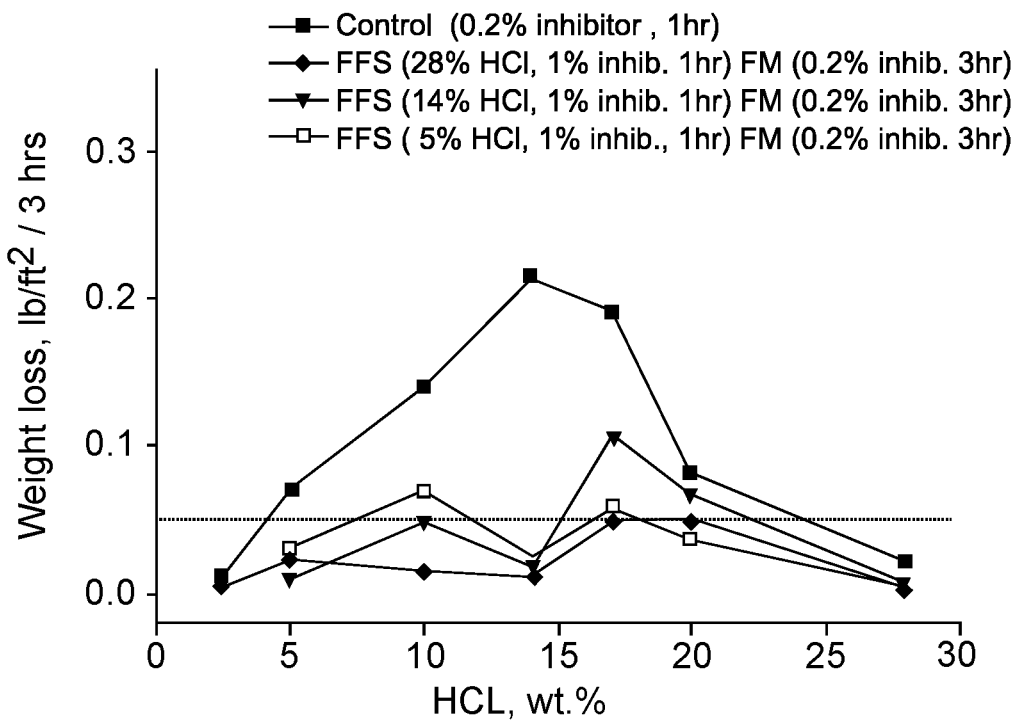
FIG. 5 is a graph showing weight loss from samples of one batch of duplex stainless steel, in a weight loss test after a pretreatment stage, plotted (on a linear scale) against concentration of hydrochloric acid, as described in Example 6.

In this example, as in the previous example, a one hour pretreatment step was again carried out before a three hour period in which steel was exposed to an acidic solution. The procedure was the same as in the previous example, except that corrosion inhibitor at a concentration of 1 wt % was included in the pretreatment. Results are given in the following table and also shown in FIG. 5.

| Pretreatment stage with 1 wt % corrosion inhibitor Acid concentration | Second stage with 0.2 wt % corrosion inhibitor | Weight loss | |
|---|---|---|---|
| (wt %) | Acid concentration (wt %) | lbs/ft$^2$ | gm/m$^2$ |
| 5% | 5% | 0.03 | 146 |
|  | 10% | 0.07 | 342 |
|  | 14% | 0.03 | 146 |
|  | 17% | 0.06 | 293 |
|  | 20% | 0.04 | 195 |
|  | 28% | 0.01 | 49 |
| 14% | 5% | 0.01 | 49 |
|  | 10% | 0.05 | 244 |
|  | 14% | 0.02 | 98 |
|  | 17% | 0.11 | 537 |
|  | 20% | 0.07 | 342 |
|  | 28% | 0.01 | 49 |

-continued

| Pretreatment stage with 1 wt % corrosion inhibitor Acid concentration (wt %) | Second stage with 0.2 wt % corrosion inhibitor Acid concentration (wt %) | Weight loss lbs/ft² | gm/m² |
|---|---|---|---|
| 28% | 5% | 0.03 | 146 |
| | 10% | 0.02 | 98 |
| | 14% | 0.02 | 98 |
| | 17% | 0.05 | 244 |
| | 20% | 0.05 | 244 |
| | 28% | 0.01 | 49 |

The following table brings together results from this example and the one before.

| Pretreatment stage with 1 wt % corrosion inhibitor | | Second stage with 0.2 wt % corrosion inhibitor | Weight loss | |
|---|---|---|---|---|
| Acid (wt %) | Inhibitor (wt %) | Acid concentration (wt %) | lbs/ft² | gm/m² |
| 5% | none | 14% | 0.17 | 830 |
| 5% | 1% | 14% | 0.03 | 146 |
| 14% | none | 14% | 0.75 | 3662 |
| 14% | 1% | 14% | 0.02 | 98 |
| 28% | none | 14% | 0.08 | 391 |
| 28% | 1% | 14% | 0.02 | 98 |

The results show that when inhibitor at 1 wt % concentration is included in the pretreatment stage, the weight loss in the second stage is reduced even further. Thus it can be seen that the inhibitor in the pretreatment stage is contributing to formation of a protective film which persists into the second stage and is maintained, giving low weight loss in the second stage. Moreover it can be appreciated from the results in Example 4 that the inhibitor in the pretreatment stage will reduce weight loss during that stage.

EXAMPLE 7

A further experiment, with a different batch of 22Cr125 steel demonstrated the value of including corrosion inhibitor to maintain the protective film established in the pretreatment stage.

The procedure was the same as in the previous example, except that there was variation in the concentration of corrosion inhibitor in both stages. The results are shown in the following table

| Pretreatment stage | | Second stage | | Weight loss | |
|---|---|---|---|---|---|
| Acid (wt %) | Inhibitor (wt %) | Acid (wt %) | Inhibitor (wt %) | lbs/ft² | gm/m² |
| 14% | none | 14% | none | 0.7 | 3418 |
| 14% | none | 14% | 0.2 wt % | 0.3 | 1465 |
| 14% | 2% | 14% | 0.05 wt % | 0.4 | 1953 |
| 14% | 2% | 14% | 0.2 wt % | 0.02 | 98 |

As can be seen from the last two lines of the table, corrosion inhibitor in the pretreatment stage was effective to provide a protective film for the second stage which was maintained by 0.2 wt % corrosion inhibitor but was not maintained when the corrosion inhibitor in the second stage was at a concentration of 0.05 wt %.

EXAMPLE 8

Figure 6:
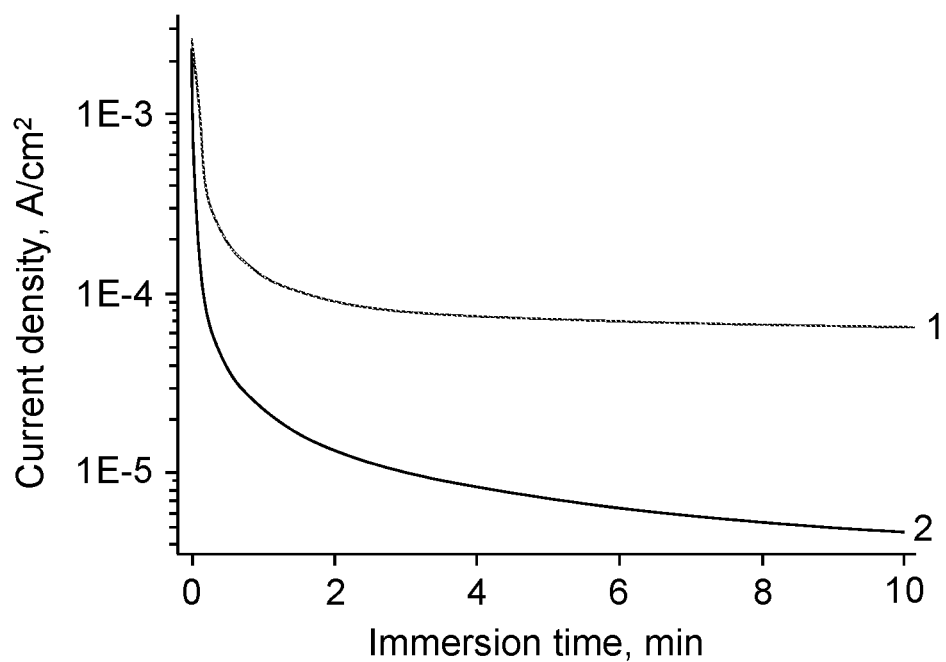
FIG. 6 shows current densities recorded during a pretreatment stage with applied electrical potential, plotted (on a logarithmic scale) against time, as described in Example 8.

This example used a modified form of the procedure of examples 5 to 7 above. An anodic electrical potential was applied to the coupons during the pretreatment stage. The coupons were from the same batch of 22Cr125 steel as those used in Examples 5 and 6. The pretreatment was carried out for only 10 minutes and at room temperature of 21° C., in 14% hydrochloric acid with and without the corrosion inhibitor present at a concentration of 0.2 wt %. A counter electrode and a Ag/AgCl reference electrode were immersed in the acid solution and an electrical potential of +0.6 volt, relative to the Ag/AgCl reference electrode, was applied to the coupons during pretreatment. The current flowing was measured and the current density (current per unit surface area) was calculated. The pretreatment was followed by a weight loss test, using 14% acid containing 0.2 wt % of the corrosion inhibitor composition mentioned in Example 3. The following table shows current density at the end of the pretreatment stage and the weight loss in the second stage. The current densities recorded during the pretreatments are shown in FIG. 6 which has a logarithmic vertical axis.

| Pretreatment 14 wt % acid, 0.6 volt for 10 minutes | Current density at 0.6 volt at end of pretreatment | Weight loss 14 wt % acid, 0.2 wt % inhibitor lb/ft² | gm/m² |
|---|---|---|---|
| none | | 0.214 | 1045 |
| no inhibitor | 6.6 mA | 0.0621 | 303 |
| 0.2 wt % inhibitor | 4.7 mA | 0.0534 | 261 |

EXAMPLE 9

This example used a similar procedure to Example 6, but a different corrosion inhibitor was used. The corrosion inhibitor was a combination of cinnamonitrile (CN) and dodecyl pyridinium chloride (DPC). During the second stage, these materials were used in two ratios. Results are in the following table.

| Pretreatment stage | | | Second stage | | | Second stage weight loss | |
|---|---|---|---|---|---|---|---|
| Acid (wt %) | CN (wt %) | DPM (wt %) | Acid (wt %) | CN (wt %) | DPM (wt %) | lbs/ft² | gm/m² |
| 14% | none | none | 14% | 0.025% | 0.095% | 0.6 | 2930 |
| 14% | 0.2% | 0.095% | 14% | 0.025% | 0.095% | 0.15 | 732 |
| 14% | none | none | 14% | 0.037% | 0.095% | 0.3 | 1465 |
| 14% | 0.2% | 0.095% | 14% | 0.037% | 0.095% | 0.05 | 244 |

Illustration of Matrix Acidizing

The following description illustrates the implementation of the present concepts at the end of a matrix acidizing job. The concentrations of acid mentioned here serve as illustrative example only. It will be appreciated that the concentration of acid when carrying out matrix acidizing is chosen for the specific formation and wellbore.

FIG. 7 schematically illustrates positioning of coiled tubing for matrix acidizing. Flow from the wellbore is halted by closing valve(s) at the wellhead. Coiled tubing 12 is drawn off from a reel 14 and taken over a guide 16 (the so called gooseneck) which turns the tubing to descend vertically into a borehole as seen in FIG. 4. The tubing 12 is lowered into the well through well control equipment 18 as illustrated by FIG. 7 until the downhole end of the tubing reaches the perforations 22 which give access to the formation outside the well casing. The well control equipment 18 includes one or more valves able to prevent flow from the wellbore.

As shown by the enlarged view FIG. 7a, the casing 24 lines the wellbore and is surrounded by cement 26 in a conventional manner. The perforations 22 extend through the casing and cement into the surrounding geological formation. The casing 24 is made of 22Cr125 steel.

An inlet 20 to the coiled tubing is provided on the reel axis. In order to treat the formation, 14 wt % hydrochloric acid is pumped into the coiled tubing 12 through its axial inlet as diagrammatically indicated by arrow 32 and down the coiled tubing 12 in the direction of arrow 34 to the formation which is to be treated. During this main pumping stage the acid contains 0.2 wt % of the corrosion inhibitor composition mentioned in Example 3.

At the end of the main pumping stage several tubing volumes of 5 wt % hydrochloric acid containing 1 wt % of the corrosion inhibitor are pumped in. At the same time the well control equipment 18 is operated to allow a similar volume to flow from the well. Consequently this acid containing 2 wt % corrosion inhibitor begins to flow up the wellbore outside the coiled tubing 12 towards the wellhead. This is followed by spent acid flowing out of the formation and up the well bore outside the coiled tubing 12 as indicated by arrows 36 in FIG. 7. Thus the casing 24 above the perforations 22 receives a pretreatment by the 5 wt % acid containing 2 wt % corrosion inhibitor before it is contacted by the spent acid containing no more than 0.2 wt % of corrosion inhibitor.

By referring to Example 4 given above will be appreciated that the acid introduced after the main pumping stage could be at the higher concentration of 28% rather than only 5 wt %.

It will be appreciated that features referred to above or shown in individual examples may be used together in any combination as well as those which have been shown and described specifically. Accordingly, all such modifications are intended to be included within the scope of this disclosure.

The invention claimed is:

1. A method of inhibiting corrosion of duplex stainless steel by aqueous acidic solution, the method comprising:
during a first period of time, carrying out a preliminary treatment which is passivation of the steel while exposing the steel to a first aqueous acidic solution containing hydrochloric acid and at least one organic corrosion inhibitor able to adsorb to a steel surface, so as to deposit a passivating and organic corrosion inhibitor film on the steel surface, wherein the passivating and organic corrosion inhibitor film on the steel surface is a passivating film that includes the at least one organic corrosion inhibitor adsorbed to the steel surface; and thereafter
during a second period of time, exposing the steel to a second aqueous acidic solution different from the first aqueous acidic solution and also containing hydrochloric acid and at least one organic corrosion inhibitor able to adsorb to the steel surface;
wherein the second aqueous acidic solution is less effective than the first aqueous acidic solution for inhibiting corrosion of uncorroded samples of the steel, the second aqueous acidic solution being less effective as determined by a comparative test of the first and second aqueous acidic solutions under same conditions and applied to respective uncorroded samples of the steel, under which conditions the second aqueous acidic solution is less effective at reducing weight loss from the steel, and
wherein the second aqueous acidic solution maintains the passivating and organic corrosion inhibitor film deposited on the steel surface thereby maintaining protection of the duplex stainless steel against acid corrosion.

2. The method according to claim 1 wherein passivation while carrying out the preliminary treatment during the first period of time is self-passivation of the steel in contact with the first aqueous acidic solution.

3. The method according to claim 1 wherein passivation while carrying out the preliminary treatment during the first period of time includes application of anodic electrical potential to the steel.

4. The method according to claim 1 wherein a concentration of the at least one organic corrosion inhibitor able to adsorb to the steel surface in the second aqueous acidic solution is less than a concentration of the at least one organic corrosion inhibitor able to adsorb to the steel surface in the first aqueous acidic solution.

5. The method according to claim 4 wherein the concentration of the at least one organic corrosion inhibitor in the second aqueous acidic solution is not more than half the concentration of the at least one organic corrosion inhibitor in the first aqueous acidic solution.

6. The method according to claim 1 wherein the at least one organic corrosion inhibitor able to adsorb to the steel surface is selected from compounds with aromatic groups and compounds with triple bonds.

7. The method according to claim 1 wherein the first aqueous acidic solution contains at least one organic corrosion inhibitor which is polymerisable on the steel surface.

8. The method according to claim 1 wherein at least one of the first and second aqueous acidic solutions comprises water-insoluble hydrophobic liquid.

9. The method according to claim 8 wherein corrosion inhibitor and hydrophobic liquid are provided by at least one corrosion inhibitor which is able to adsorb to a steel surface and which is a water-insoluble hydrophobic liquid.

10. The method according to claim 1 wherein the first aqueous acidic solution comprises at least one organic corrosion inhibitor able to adsorb to a steel surface and a separate water-insoluble hydrophobic oil.

11. The method according to claim 1 wherein the first period of time is not more than one hour and the second period of time is at least three times as long as the first period of time.

12. The method according to claim 1 wherein the duplex stainless steel is wellbore casing.

13. The method according to claim 1 wherein the passivating and organic corrosion inhibitor film includes a stable, insoluble molybdenum oxide film.

14. The method according to claim 1 wherein the steel includes 22Cr125 steel, HS80 steel, N80 steel, or 13Cr80 steel.

15. The method according to claim 14 wherein the steel is 22Cr125 steel and as acid strength of the first aqueous acidic solution increases, weight loss of the 22Cr125 steel increases then decreases.

16. The method according to claim 14 wherein the steel is HS80 steel, N80 steel, or 13Cr80 steel and as the acid strength of the first aqueous acidic solution increases, weight loss of samples of HS80, N80, and 13Cr80 steels progressively increase.

* * * * *